UNITED STATES PATENT OFFICE.

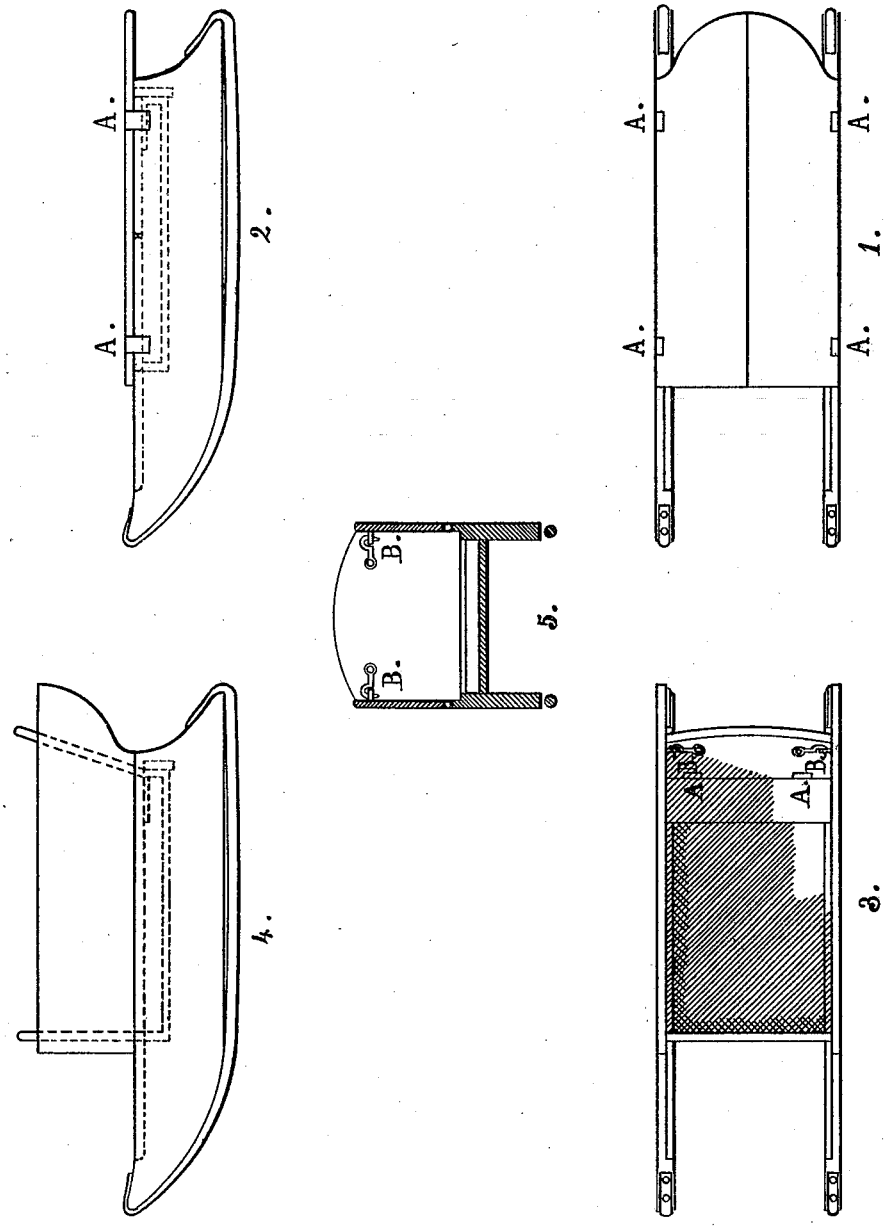

JOHN H. BROWN, OF LYNN, ASSIGNOR OF ONE-HALF HIS RIGHT TO CHARLES H. COLE, OF DEDHAM, MASSACHUSETTS.

IMPROVEMENT IN SLEDS.

Specification forming part of Letters Patent No. 185,387, dated December 19, 1876; application filed August 24, 1876.

*To all whom it may concern:*

Be it known that I, JOHN H. BROWN, of Lynn, in the county of Essex and Commonwealth of Massachusetts, have invented certain new and useful Improvements in Sleds; and I do hereby declare that the following is a full and exact description thereof, reference being had to the accompanying drawing, which forms a part of this specification, in which—

Figure 1 represents the sled when closed and ready for use as an ordinary sled. Fig. 2 is a side elevation of Fig. 1. Fig. 3 represents the sled when open and forming a large box or sleigh. Fig. 4 is a side elevation of Fig. 3. Fig. 5 is a transverse section of the same.

A represents hinges used in forming the sled into a box or sleigh. B represents hooks and staples used in holding the movable parts of the sled firmly in their places.

The nature of my invention consists in a novel construction and combination of the ordinary coasting-sled with a large box or sleigh top; also, in a combination of the ordinary coasting-sled with a small box between the runners.

To enable others skilled in the art to make and use my invention, I will proceed to describe its construction and operation.

The tops of the runners are grooved, as shown in Figs. 2 and 4, and partially shown in Figs. 1 and 3, from near the forward end, their entire length, the width of the groove being about one-half the thickness of the runner, and its depth being from half an inch to an inch. Between these runners is placed a box, of any required depth, in such a way that the inside of the runners forms the sides of the box, the ends of the box being attached firmly to the runners, and the top of these ends, where they connect with the runners, being just even with the bottom of the groove. Attached, by hinges, to the ends of this box are pieces of boards, or other material, so adjusted that when the rounded parts, one of which is shown in Fig. 5, are turned toward each other and laid down flat, with the ends resting in the groove of the runners, they form a cover to the box between the runners, as imperfectly represented in Fig. 2. When these pieces are raised into a nearly-upright position, as shown in Fig. 4, they, together with the ends of the small box upon which these pieces rest, form the ends of the large box or sleigh top.

Connected with the top of the runners, by the hinges A A, are pieces of board, or other material, of the shape shown in Fig. 1, with a thickness equivalent to one-half the thickness of the runner, and any desired width proportional to the width of the sled. These pieces, when their longest straight edges are turned toward each other and laid down flat, form the top of the sled, as shown in Fig. 1. When raised into an upright position, with their shortest edges resting upon the top of the runners, they form the sides of the large box or sleigh top.

All the movable parts are hung on hinges, and are fastened in their places by hooks and staples.

A seat of any desired width may be placed across the end of the small box, with its ends resting in the grooves of the runners.

What I claim as my invention, and desire to secure by Letters Patent, is—

A box-sled having the ends and sides of the box hinged to the frame or runners, and adapted to fold inward between the runners upon each other, and form an ordinary coasting-sled, substantially as shown and described.

JOHN H. BROWN.

Witnesses:
W. C. COGSWELL,
S. H. GOODALL.